UNITED STATES PATENT OFFICE.

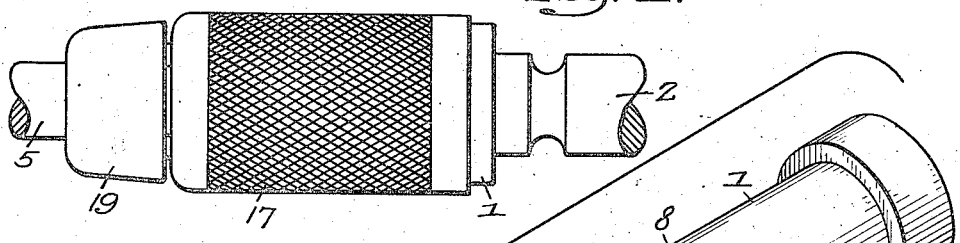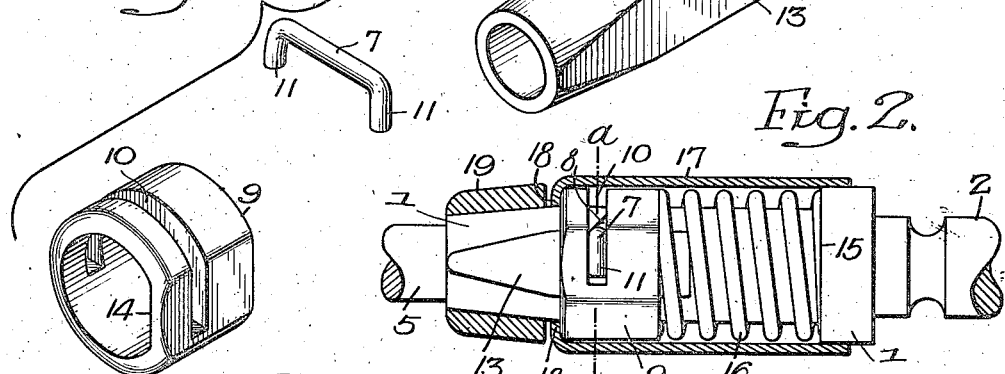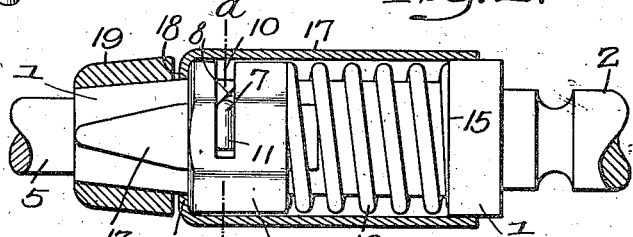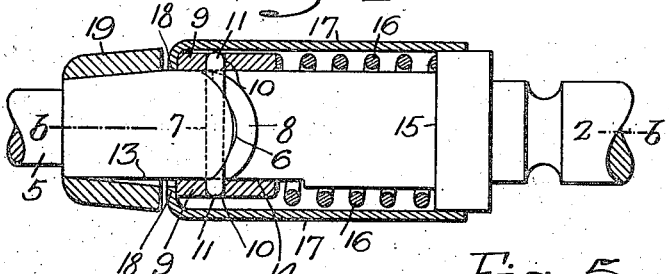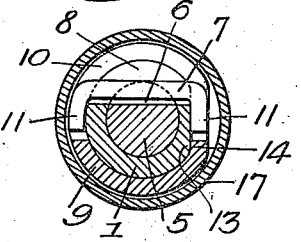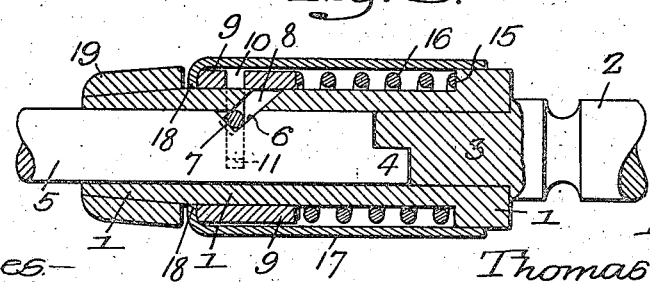

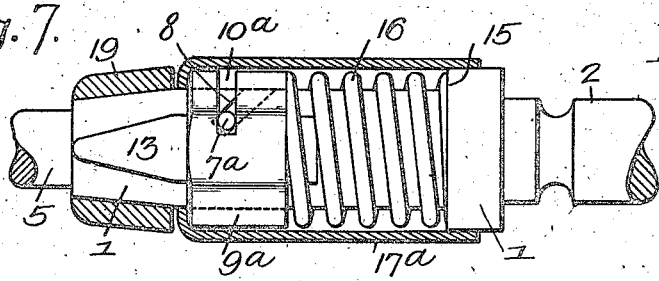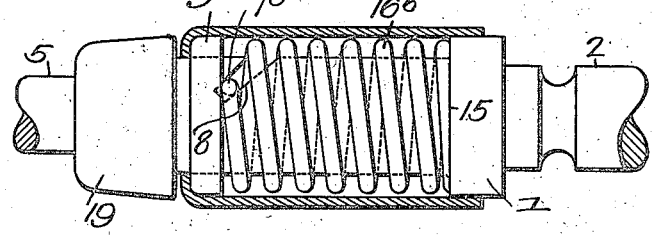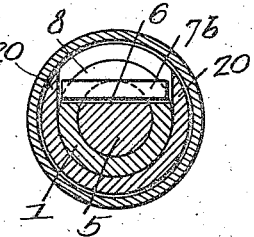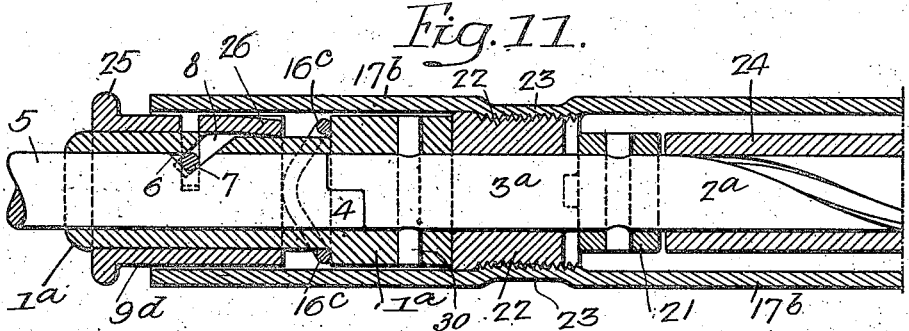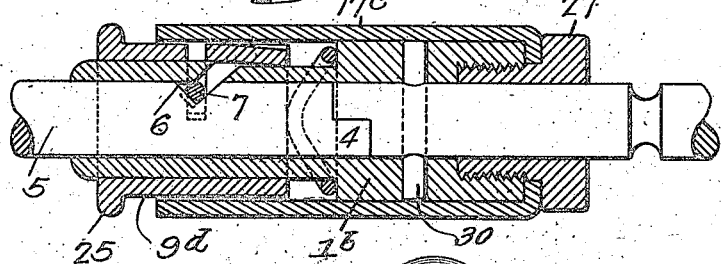

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

CHUCK.

1,138,465.  Specification of Letters Patent.  Patented May 4, 1915.

Application filed November 19, 1914. Serial No. 872,962.

*To all whom it may concern:*

Be it known that we, THOMAS J. FEGLEY and GEORGE O. LEOPOLD, citizens of the United States, and residents of Philadelphia, county of Philadelphia, State of Pennsylvania, have invented certain Improvements in Chucks, of which the following is a specification.

Our invention relates to certain improvements in a chuck for holding tools and other pieces firmly in drill and lathe spindles, although it can be used as a chuck for hand tools, or in any place where it is desired to rigidly attach one article to another.

The object of the invention is to design the chuck so that a notched tool will be held by a cross bar, which can be moved out of engagement with the tool by a longitudinal movement of an element carrying the bar.

The invention also relates to details of construction which will be fully described hereinafter.

In the accompanying drawings: Figure 1 is a side view of our improved chuck; Fig. 2 is a longitudinal sectional view; Fig. 3 is a transverse sectional view on the line a—a, Fig. 2; Fig. 4 is a sectional plan view; Fig. 5 is a true longitudinal sectional view on the line b—b, Fig. 4; Fig. 6 is a detached perspective view, showing the body portion, sleeve, and cross bar detached; Fig. 7 is a sectional view of a modification, showing the use of a plain straight bar; Fig. 8 is a perspective view of the bar illustrated in Fig. 7; Fig. 9 is a transverse sectional view, showing the straight bar and the sleeve extended at each end of the bar to hold the bar in position; Fig. 10 is a longitudinal sectional view of a modification in which part of the spring is used as the cross bar; Fig. 11 is a longitudinal sectional view, illustrating a further modification in which the chuck is adapted to a push drill; Fig. 12 is a longitudinal sectional view, showing a modification illustrated in Fig. 11 and adapted to the same type of drill as that illustrated in Fig. 1; and Fig. 13 is a perspective view of the operating sleeve used in the modification illustrated in Figs. 11 and 12.

Referring to Figs. 1 to 6, inclusive, of the drawings, 1 is the body portion of the chuck which is adapted to the spindle 2 in any suitable manner. In the present instance, the spindle has a stem 3 which extends into the body portion 1 and the end 4 of this stem is stepped so as to receive the stepped end of the drill bit 5. This stem is driven into the body portion and may be further secured in any manner found desirable. The bit 5 has a notch 6 into which extends a cross bar 7 which holds the bit in the chuck. In the body portion 1 is an inclined slot 8, shaped as clearly shown in Fig. 6, and the width of this slot is such as to freely receive the cross bar 7 so that the bar can be forced into and out of the notch as hereinafter described. Mounted on the body portion 1 is a sleeve 9 having a transverse slot 10 of a width to receive the cross bar 7. The ends 11 of the cross bar are turned down so as to rest in the slot 10, as shown in Figs. 2 and 3, thus holding the cross bar rigidly in position as regards lateral movement. The sleeve 9 is arranged to slide longitudinally on the body portion and the body portion is flattened, as at 13, Fig. 6, and the sleeve has a flattened portion 14 so that when the sleeve is mounted on the body it can not turn thereon. Located between the rear end of the sleeve 9 and a shoulder 15 on the body portion is a coiled spring 16, which tends to force the sleeve forward and to hold the bar in the bottom of the slot 8. 17 is a casing which incloses the sleeve 9 and the spring 16 and has an inturned flange 18 at the forward end which extends over the end of the sleeve 9. This flange is prevented from moving outward by a collar 19 forced onto the end of the body portion 1, as illustrated in Fig. 2. Thus the casing 17 is free to turn on the chuck, but on retracting the casing it will also retract the sleeve and compress the spring 16, forcing the bar 7 out of engagement with the bit 5. On releasing the casing the spring 16 will force the sleeve forward and this sleeve will carry with it the bar so that the bar will be forced into the lower portion of the slot 8 of the body portion and when the bit 5 is in position the bar will enter the notch 6 in the bit and will hold the bit in position in the chuck. By making the casing 17 loose, as shown, it forms a hand hold for the tool when the operator is reciprocating the element that rotates the tool.

In Figs. 7 and 8, we have illustrated a modification in which the cross bar 7ª is straight and the slot 10ª in the sleeve 9ª is less in depth than that illustrated in Fig. 6, and the bar is held longitudinally in this instance by the casing 17ª.

In Fig. 9, we have illustrated a modification of the form of chuck illustrated in Fig. 7, in which the sleeve has abutments 20, which extend at each end of the cross bar 7ᵇ, retaining it in the longitudinal position.

In Fig. 10, we have illustrated a type in which one of the convolutions of the spring 16ᵇ forms the cross bar 7ᶜ. In this instance, the sleeve 9ᶜ is narrow and the rear end of the sleeve bears against the first convolution of the spring so that, when the casing is retracted, the end 7ᶜ of the spring is forced rearward and out of engagement with the bit.

In Figs. 11, 12 and 13, we have illustrated another modification of the invention in which the casing does not actuate the sleeve. In this instance, the body portion 1ª has the inclined slot 8 for the cross bar 7. This body portion is secured to the stem 3ª by a transverse pin 30. Mounted on the stem between the collar 21 and the rear end of the body portion 1ª is a loose section 22 having an external thread thereon and the casing 17ᵇ is extended and has a raised portion 23, which meshes with the threads of the loose section 22. In this case, as above remarked, the casing 17ᵇ not only extends over the sleeve 9ᵈ, but also extends rearwardly over the spindle 2ª, as the construction illustrated in Fig. 11 is used in connection with the push drill in which a long actuating sleeve 24 moves longitudinally between the casing 17ᵇ and the spindle 2ª so as to rotate the spindle. This portion of the tool is common in the art. The sleeve 9ᵈ has, at its outer end, an external flange so that on grasping the flange the sleeve can be pushed back to force the rod 7 out of engagement with the spindle. The spring 16ᶜ, in this instance, is short and is shaped as clearly illustrated in Fig. 11. The sleeve 9ᵈ is prevented from turning on the body portion 1ª by a tongue 26 on the sleeve which is pressed onto the flat surface of the body portion.

In Fig. 12, we have illustrated the chuck shown in Fig. 11, having a short casing 17ᶜ, which extends over the spring and a portion of the sleeve 9ᵈ and is held from moving longitudinally by a flanged screw plug 27, which is screwed into the end of the body portion 1ᵇ.

The essential feature of the invention is the body portion having an inclined slot to receive the bar and a sleeve moving longitudinally on the body portion for shifting the bar into and out of engagement with the bit or other element mounted in the chuck.

We claim:

1. The combination in a chuck, of a body portion having an opening for a tool bit, or other device, and having a diagonal, transverse slot communicating with the central opening; a locking bar mounted in the slot and arranged to engage a tool bit, or other device, to be held in the chuck; and means for moving the bar into and out of position in the slot.

2. The combination in a chuck, of a body portion having an opening therein for a bit, or other article to be secured thereto, and having a transverse diagonal slot; a bar mounted in the slot; and a sleeve longitudinally movable on the body portion and engaging the bar so that, when the sleeve is moved, the bar will be forced out of engagement with the bit, or other device, located in the body portion.

3. The combination in a body portion having an opening for the reception of a bit, or other device, and having a diagonal slot communicating with the said opening; a sleeve mounted on the body portion and having a transverse slot; a locking bar extending through both slots; and a spring mounted on the body portion and bearing against a shoulder thereon and against the sleeve and tending to hold the bar in the projected position.

4. The combination in a chuck, of a body portion having a longitudinal opening therein and having a stepped stem to receive the stepped end of a drill bit and having a diagonal slot extending forwardly and communicating with the central opening; a sleeve mounted on the body portion and having a transverse slot therein at an angle with respect to the slot in the body portion; a bar extending through both slots; a spring back of the sleeve tending to force the sleeve forward and the bar into the diagonal slot to its full depth so as to enter a notch in the bit located in the body portion; and means for preventing the sleeve from turning in the body portion.

5. The combination of a body portion having a longitudinal opening therein and an external shoulder and having a diagonal slot extending forwardly and communicating with the longitudinal opening; a sleeve mounted on the body portion and having a transverse slot; a transverse bar having the ends turned at right angles to the body of the bar, said ends being located in the transverse slot of the sleeve; and a spring located between the shoulder on the body portion and the sleeve.

6. The combination in a chuck, of a body portion having a longitudinal opening therein for the bit and having a transverse, inclined slot communicating with the longitudinal opening and having a flattened portion and a shoulder; a sleeve arranged to slide longitudinally on the body portion and having a transverse slot; means engaging said flattened portion for preventing the sleeve turning on the body portion; a bar mounted in the slot of the body portion and in the slot of the sleeve; a spring mounted between the shoulder on the body portion and the sleeve; and a casing covering the parts and engaging the sleeve so that on moving the casing longitudinally the bar will be forced back against the pressure of the spring.

7. The combination in a chuck, of a body portion having a longitudinal opening therein for a bit and having an inclined transverse slot and a collar at its outer end; a cross bar mounted in the slot and arranged to engage a bit located in the opening of the body portion; a sleeve mounted on the body portion and engaging the bar; a spring tending to force the sleeve and bar in one direction; and an inclosing casing having an inturned flange at its outer end extending between the outer end of the sleeve and the collar at the end of the body portion.

In testimony whereof, we have signed our names to this specification, in the presence of two subscribing witnesses.

THOMAS J. FEGLEY.
GEORGE O. LEOPOLD.

Witnesses:
WM. E. SHUPE,
WM. A. BARR.